US008751336B2

(12) United States Patent
Menninger (10) Patent No.: US 8,751,336 B2
(45) Date of Patent: Jun. 10, 2014

(54) E-CATALOGUE ORDERING FOR A SUPPLY CHAIN MANAGEMENT SYSTEM

(75) Inventor: Anthony F. Menninger, Miami, FL (US)

(73) Assignee: Restaurant Services, Inc., Coral Gables, FL (US)

( * ) Notice: Subject to any disclaimer, the term of this patent is extended or adjusted under 35 U.S.C. 154(b) by 3411 days.

(21) Appl. No.: 10/959,307

(22) Filed: Oct. 7, 2004

(65) Prior Publication Data

US 2005/0177450 A1 Aug. 11, 2005

Related U.S. Application Data

(60) Provisional application No. 60/510,084, filed on Oct. 10, 2003.

(51) Int. Cl.
*G06Q 10/00* (2012.01)

(52) U.S. Cl.
USPC .............................. 705/28; 705/26.1

(58) Field of Classification Search
USPC .................................. 705/28, 26.1
See application file for complete search history.

(56) References Cited

U.S. PATENT DOCUMENTS

| | | | |
|---|---|---|---|
| 4,734,858 A | 3/1988 | Schlafly | |
| 4,799,156 A | 1/1989 | Shavit et al. | |
| 4,855,908 A | 8/1989 | Shimoda et al. | |
| 4,992,940 A * | 2/1991 | Dworkin | 705/26 |
| 5,204,821 A | 4/1993 | Inui et al. | |
| 5,319,542 A | 6/1994 | King, Jr. et al. | |
| 5,490,060 A | 2/1996 | Malec et al. | |
| 5,528,490 A | 6/1996 | Hill | |
| 5,638,519 A | 6/1997 | Haluska | |
| 5,721,832 A | 2/1998 | Westrope et al. | |
| 5,758,327 A | 5/1998 | Gardner et al. | |
| 5,802,502 A | 9/1998 | Gell et al. | |
| 5,854,746 A | 12/1998 | Yamamoto et al. | |
| 5,893,076 A | 4/1999 | Hafner et al. | |
| 5,898,765 A | 4/1999 | Teglovic et al. | |

(Continued)

FOREIGN PATENT DOCUMENTS

WO    WO/0051038 A1 *  8/2000  .............. G06F 17/40

OTHER PUBLICATIONS

Tibben-Lembke, R.S. et al., Replacement Parts Management: The Value of Infomation, Journal of Business Logistics, vol. 22, No. 2, 2001, pp. 149-164.*

(Continued)

*Primary Examiner* — Andre Boyce
*Assistant Examiner* — Tiphany Dickerson
(74) *Attorney, Agent, or Firm* — Foley & Lardner LLP (57) ABSTRACT

A method and program product comprising collecting from the network sales data for at least one product from a plurality of entities in the supply chain management system over a period of time; maintaining an electronic database of products, with each product having associated therewith in the database one or more items of equipment used to produce the product; if a criteria is met, performing a calculation to obtain usage data at a particular entity for an item of equipment of a particular type; accessing at least one equipment supplier electronic catalogue that contains the particular type of equipment represented by the item of equipment, selecting at least one of the items of equipment in the catalogue based on the usage data for the item of equipment and a characteristic; and displaying the selected one of the catalogue items of equipment.

53 Claims, 3 Drawing Sheets

(56) References Cited

U.S. PATENT DOCUMENTS

| | | | |
|---|---|---|---|
| 5,914,878 A | 6/1999 | Yamamoto et al. | |
| 5,953,707 A | 9/1999 | Huang et al. | |
| 5,970,475 A | 10/1999 | Barnes et al. | |
| 6,009,407 A | 12/1999 | Garg | |
| 6,023,683 A | 2/2000 | Johnson et al. | |
| 6,032,125 A | 2/2000 | Ando | |
| 6,055,516 A | 4/2000 | Johnson et al. | |
| 6,058,375 A | 5/2000 | Park | |
| 6,061,691 A | 5/2000 | Fox | |
| 6,078,900 A | 6/2000 | Ettl et al. | |
| 6,141,653 A | 10/2000 | Conklin et al. | |
| 6,148,291 A | 11/2000 | Radican | |
| 6,151,582 A | 11/2000 | Huang et al. | |
| 6,157,915 A | 12/2000 | Bhaskaran et al. | |
| 6,167,378 A | 12/2000 | Webber, Jr. | |
| 6,260,024 B1 | 7/2001 | Shkedy | |
| 6,263,317 B1 | 7/2001 | Sharp et al. | |
| 6,266,652 B1 | 7/2001 | Godin et al. | |
| 6,292,894 B1 | 9/2001 | Chipman et al. | |
| 6,324,522 B2 | 11/2001 | Peterson et al. | |
| 6,338,050 B1 | 1/2002 | Conklin et al. | |
| 6,360,216 B1 | 3/2002 | Hennessey et al. | |
| 6,366,890 B1 | 4/2002 | Usrey | |
| 6,393,408 B1 | 5/2002 | Mosher et al. | |
| 6,397,226 B1 | 5/2002 | Sage | |
| 6,477,513 B1 | 11/2002 | Walker et al. | |
| 6,486,899 B1 | 11/2002 | Bush, Jr. | |
| 6,505,172 B1 | 1/2003 | Johnson et al. | |
| 6,564,226 B1 | 5/2003 | Dickson et al. | |
| 6,587,827 B1 | 7/2003 | Hennig et al. | |
| 6,609,101 B1 | 8/2003 | Landvater | |
| 6,622,056 B1 | 9/2003 | Lindell | |
| 6,643,624 B2 | 11/2003 | Philippe et al. | |
| 6,671,673 B1 | 12/2003 | Baseman et al. | |
| 6,671,818 B1 | 12/2003 | Mikurak | |
| 6,697,702 B1 | 2/2004 | Hahn-Carlson | |
| 6,816,746 B2* | 11/2004 | Bickley et al. | 700/99 |
| 6,856,418 B2* | 2/2005 | Cheney | 358/1.15 |
| 6,889,197 B2 | 5/2005 | Lidow | |
| 7,003,474 B2 | 2/2006 | Lidow | |
| 7,546,253 B2* | 6/2009 | Andersson et al. | 705/7.38 |
| 2001/0020230 A1 | 9/2001 | Kaneko et al. | |
| 2001/0032126 A1 | 10/2001 | Macartney-Filgate et al. | |
| 2002/0007324 A1 | 1/2002 | Centner et al. | |
| 2002/0016760 A1 | 2/2002 | Pathak | |
| 2002/0019759 A1 | 2/2002 | Arunapuram et al. | |
| 2002/0019761 A1 | 2/2002 | Lidow | |
| 2002/0034673 A1 | 3/2002 | Bisaka et al. | |
| 2002/0049649 A1 | 4/2002 | Kubota | |
| 2002/0065698 A1* | 5/2002 | Schick et al. | 705/8 |
| 2002/0069028 A1 | 6/2002 | Merz et al. | |
| 2002/0069096 A1 | 6/2002 | Lindoerfer et al. | |
| 2002/0087371 A1* | 7/2002 | Abendroth | 705/7 |
| 2002/0099580 A1 | 7/2002 | Eicher, Jr. et al. | |
| 2002/0099598 A1 | 7/2002 | Eicher, Jr. et al. | |
| 2002/0107761 A1 | 8/2002 | Kark et al. | |
| 2002/0123945 A1 | 9/2002 | Booth et al. | |
| 2002/0128946 A1 | 9/2002 | Chehade et al. | |
| 2002/0143669 A1 | 10/2002 | Scheer | |
| 2002/0143692 A1 | 10/2002 | Heimermann et al. | |
| 2002/0147622 A1 | 10/2002 | Drolet et al. | |
| 2002/0165806 A1 | 11/2002 | Kataria et al. | |
| 2002/0169657 A1 | 11/2002 | Singh et al. | |
| 2002/0169658 A1 | 11/2002 | Adler et al. | |
| 2002/0188499 A1 | 12/2002 | Jenkins et al. | |
| 2002/0194043 A1 | 12/2002 | Lidow | |
| 2002/0194057 A1 | 12/2002 | Lidow | |
| 2002/0198759 A1 | 12/2002 | Gilday et al. | |
| 2003/0009392 A1 | 1/2003 | Perkowski | |
| 2003/0033192 A1 | 2/2003 | Zyman et al. | |
| 2003/0208390 A1 | 11/2003 | Posner | |
| 2003/0208434 A1 | 11/2003 | Posner | |
| 2003/0212610 A1 | 11/2003 | Duffy et al. | |
| 2004/0010463 A1 | 1/2004 | Hahn-Carlson et al. | |
| 2004/0019494 A1* | 1/2004 | Ridgeway et al. | 705/1 |
| 2005/0033593 A1* | 2/2005 | Abrams | 705/1 |

OTHER PUBLICATIONS

Noori, Hamid; Production and Operations Management; Total Quality Responsiveness; McGraw-Hill; 1995; pp. 422-519.

Noori, Hamid; Production and Operations Management; Total Quality Responsiveness; McGraw-Hill; 1995; pp. 592-601.

PR Newswire: Andersen Consulting Announce Strategic Alliance, Looksmart, Sep. 6, 2000.

Stephanie Stahl, "A Whopping Inventory Task—Burger King's purchasing agency lures suppliers online to streamline its huge distribution system", Informationweek, 1994.

John Rendleman, "Burger King Orders AT&T Mail Service", CommunicationsWeek, 1994.

Microsoft Computer Dictionary, $4^{th}$ Edition, Microsoft Press, 1999, pp. 167, 242, 334, 421, 443, 444 and 462.

Information on Deal Time International, 1999-2002, printed through www.archive.org.

Microsoft Press Computer Dictionary; $3^{rd}$ Edition; 1997; Microsoft Press; pp. 355 and 463.

Merriam Webster's Collegiate Dictionary; $10^{th}$ Edition; 1996; p. 139.

Troyer, Charles; The Role of Bar Codes in Food Safety; Food Distributors International; May 2000, entire document.

Common identification Standards; GCI; Global Scorecard.net—Guide to ECT concepts.

Microsoft Press Computer Dictionary $3^{rd}$ Edition; 1997; Microsoft Press; p. 258.

e-Commerce Solutions for Supply Chain Management: A Comparative Review; Jan. 2001; Lau, Jason.

* cited by examiner

FIG. 1

E-CATALOGUE ORDERING FOR A SUPPLY CHAIN MANAGEMENT SYSTEM

BACKGROUND OF THE INVENTION

The purchase of production equipment for franchise stores is typically uncoordinated and is performed by a manager with minimal experience is making such purchases.

SUMMARY OF THE INVENTION

In one embodiment of the present invention, a program product is provided comprising machine-readable program code for causing, when executed, a machine to perform the following method for a supply chain management system utilizing a network: collecting sales data from the network for at least one product from a plurality of entities in the supply chain management system over a period of time; maintaining an electronic database of products, with each product having associated therewith in the database one or more items of equipment used to produce the product; if a criteria is met, performing a calculation to obtain usage data at a particular entity for an item of equipment of a particular type using, at least in part, the collected sales data for products produced by the particular type of equipment at the particular entity; accessing at least one equipment supplier electronic catalogue that contains the particular type of equipment represented by the item of equipment, with each of a plurality of catalogue items of equipment under this type of equipment having a different characteristic; selecting at least one of the items of equipment in the catalogue based on the usage data for the item of equipment and the characteristic; and displaying the selected one of the catalogue items of equipment.

In a further embodiment of the present invention, the step of performing a calculation comprises for the particular type of equipment aggregating from the collected sales data sales data for the products produced by the particular type of equipment at a particular entity and performing calculations to obtain usage data for the item of equipment of the particular type.

In a further embodiment of the invention, the criteria is that a request has been received over the network from an entity in the supply chain management system for purchase information for the item of equipment.

In a further embodiment of the invention, the criteria is that the usage data for the item of equipment has been compared to a usage rating associated with that item of equipment; and it has been determined that the usage rating is exceeded by a predetermined amount.

In a further embodiment of the invention, program code is provided to carry out the steps of receiving a selection of an optimization goal; and selecting the at least one catalogue item based on the selected optimization goal, the usage data, and the characteristic.

In a further embodiment of the invention, the optimization goal is one of cost, maintenance requirements, energy requirements, and level of service.

In a further embodiment of the invention, the calculation comprises dividing the usage data by the number of the items of equipment of the same type used by the entity to produce the product.

In a further embodiment of the invention, a plurality of different equipment supplier catalogues are accessed.

In a further embodiment of the invention, a catalogue item of equipment is selected from each equipment supplier catalogue and displayed.

In a further embodiment of the invention, the item of equipment is used to produce at least two different products.

In a further embodiment of the invention, a name of a second item of equipment related to the production of the product or products produced by the item of equipment are associated with the product in the database; and program code is provided for displaying the name of the second item of equipment for potential replacement to the entity with the display of the selected catalogue item of equipment.

In a further embodiment of the invention, the database contains information about a size of an equipment workspace for the entity, and wherein the selecting step uses the size of the equipment workspace as a factor in selecting the catalogue item of equipment.

In a further embodiment of the invention, the database contains warranty period information associated with the item of equipment; and further comprising program code for performing a time algorithm to determine if the warranty associated with the item of equipment has lapsed; and if the warranty for the item of equipment has not lapsed, then sending a message via the network to the entity making a notification relating to the warranty.

In a further embodiment of the invention, a program product is provided comprising machine-readable program code for causing, when executed, a machine to perform the following method for a supply chain management system utilizing a network: collecting point of sale data from the network for a plurality of products from a plurality of entities over a period of time; maintaining an electronic database of products, with each product having associated therewith in the database one or more items of equipment used to produce the product and a rating characteristic based usage for the item of equipment; aggregating the point of sale data for the products produced by that type of item of equipment at the entity and performing calculations to obtain usage data for the item of equipment; comparing the usage data for the item of equipment to the rating characteristic associated with that item of equipment; and if a criteria is met, then sending a communication on the network to the entity.

In a further embodiment of the invention, program code is provided for: accessing at least one electronic equipment supplier catalogue that contains a type of equipment represented by the item of equipment, with each of a plurality of the catalogue items of equipment under this type of equipment having a different characteristic; selecting one of the catalogue items of equipment based at least in part on the usage data for the item of equipment; and displaying the selected one of the catalogue items of equipment to the entity.

In a further embodiment of the invention, the rating characteristic is projected usage life for the item of equipment.

In a further embodiment of the invention, the rating characteristic is a level of service.

In a further embodiment of the invention, the rating characteristic is an energy rating.

In a further embodiment of the invention, the rating characteristic is a maintenance requirement.

In a yet further embodiment of the present invention, a computer implemented method is provided for a supply chain management system utilizing a network, comprising: collecting sales data from the network for at least one product from a plurality of entities in the supply chain management system over a period of time; maintaining an electronic database of products, with each product having associated therewith in the database one or more items of equipment used to produce the product; if a criteria is met, performing an electronic calculation to obtain usage data at a particular entity for an item of equipment of a particular type using, at least in part, the collected sales data for products produced by the particular type of equipment at the particular entity; accessing at least one equipment supplier electronic catalogue that contains the particular type of equipment represented by the item of equipment, with each of a plurality of catalogue items of equipment under this type of equipment having a different characteristic; selecting at least one of the items of equipment in the catalogue based on the usage data for the item of equipment and the characteristic; and displaying the selected one of the catalogue items of equipment.

In a yet further embodiment of the present invention, a computer implemented method is provided for a supply chain management system utilizing a network, comprising: collecting point of sale data from the network for a plurality of products from a plurality of entities over a period of time; maintaining an electronic database of products, with each product having associated therewith in the database one or more items of equipment used to produce the product and a rating characteristic based on usage for the item of equipment; aggregating the point of sale data for the products produced by that type of item of equipment at the entity and performing calculations to obtain usage data for the item of equipment; comparing the usage data for the item of equipment to the rating characteristic associated with that item of equipment; and if a criteria is met, then sending a communication on the network to the entity.

In a yet further embodiment of the present invention, a system for supply chain management utilizing a network is provided, comprising: a component for collecting sales data from the network for at least one product from a plurality of entities in the supply chain management system over a period of time; a component for maintaining an electronic database of products, with each product having associated therewith in the database one or more items of equipment used to produce the product; a component for, if a criteria is met, performing a calculation to obtain usage data at a particular entity for an item of equipment of a particular type using, at least in part, the collected sales data for products produced by the particular type of equipment at the particular entity; a component for accessing at least one equipment supplier electronic catalogue that contains the particular type of equipment represented by the item of equipment, with each of a plurality of catalogue items of equipment under this type of equipment having a different characteristic; a component for selecting at least one of the items of equipment in the catalogue based on the usage data for the item of equipment and the characteristic; and a component for displaying the selected one of the catalogue items of equipment.

In a yet further embodiment of the present invention, a system for supply chain management utilizing a network is provided, comprising: a component for collecting point of sale data from the network for a plurality of products from a plurality of entities over a period of time; an electronic database of products, with each product having associated therewith in the database one or more items of equipment used to produce the product and a rating characteristic based on usage for the item of equipment; a component for aggregating the point of sale data for the products produced by that type of item of equipment at the entity and performing calculations to obtain usage data for the item of equipment; a component for comparing the usage data for the item of equipment to the rating characteristic associated with that item of equipment; and a component for, if a criteria is met, sending a communication on the network to the entity.

DETAILED DESCRIPTION OF THE PREFERRED EMBODIMENTS

The present invention is directed to enhancing a supply chain management system. The invention utilizes a network to provide special services relating to equipment replacement for members of the supply chain. The supply chain system may be composed of independent members and/or members affiliated with a central organization. Details of the supply chain management system are provided in application Ser. No. 09/834,924 filed Apr. 13, 2001 by Hoffman et al., hereby incorporated by reference.

The present invention overcomes traditional difficulties with supply chain information flows, namely that the flow of information is fragmented, untimely, and/or nonexistent. Further, the present invention overcomes deficiencies in prior art supply chain information systems such as limited access; limited participation; and inadequate infrastructure; which result in the unavailability of accurate, timely management information from Supply Chain activities; business decisions not being based on the best information; unfavorable impact on the cost of products; and other error prone, time consuming, and costly activities throughout the Supply Chain.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Referring again to the supply chain management system of the present invention, the organizational structure, technology applications and information systems that form portions of the Supply Chain are enablers that allow for effective management of the Supply Chain. The methodology of the present invention provides the means to efficiently capture, analyze and feed back timely Supply Chain data to the appropriate parties.

The claimed invention is applicable to many different industries, including but not limited to, pharmaceuticals, health and personal care products, computer and internet technology, automotive, home product supply, food and beverage, telecommunications, machinery, air conditioning and refrigeration, chemical, department store supply, office product supply, aircraft and airline related industries, education, consumer electronics, hotel, gasoline stations, convenience stores, music and video, etc.

The present invention includes a supply chain management system involving at least one supply chain participant, and preferably multiple supply chain participants. Supply chain participants include a supply chain manager. The supply chain manager may be a supply chain participant, a department of, division of or consultant for a supply chain participant, or an independent entity unrelated to the other supply chain participants. The supply chain manager may be allowed to exercise management rights without taking title or possession of any goods passing through the supply chain.

Supply chain participants may also include brand owners, point of sale outlets, point of sale outlet owners, a cooperative or consortium of point of sale outlet owners, distributors, and suppliers. Suppliers may supply one or more of finished goods, partially finished goods or raw materials.

Figure 1:
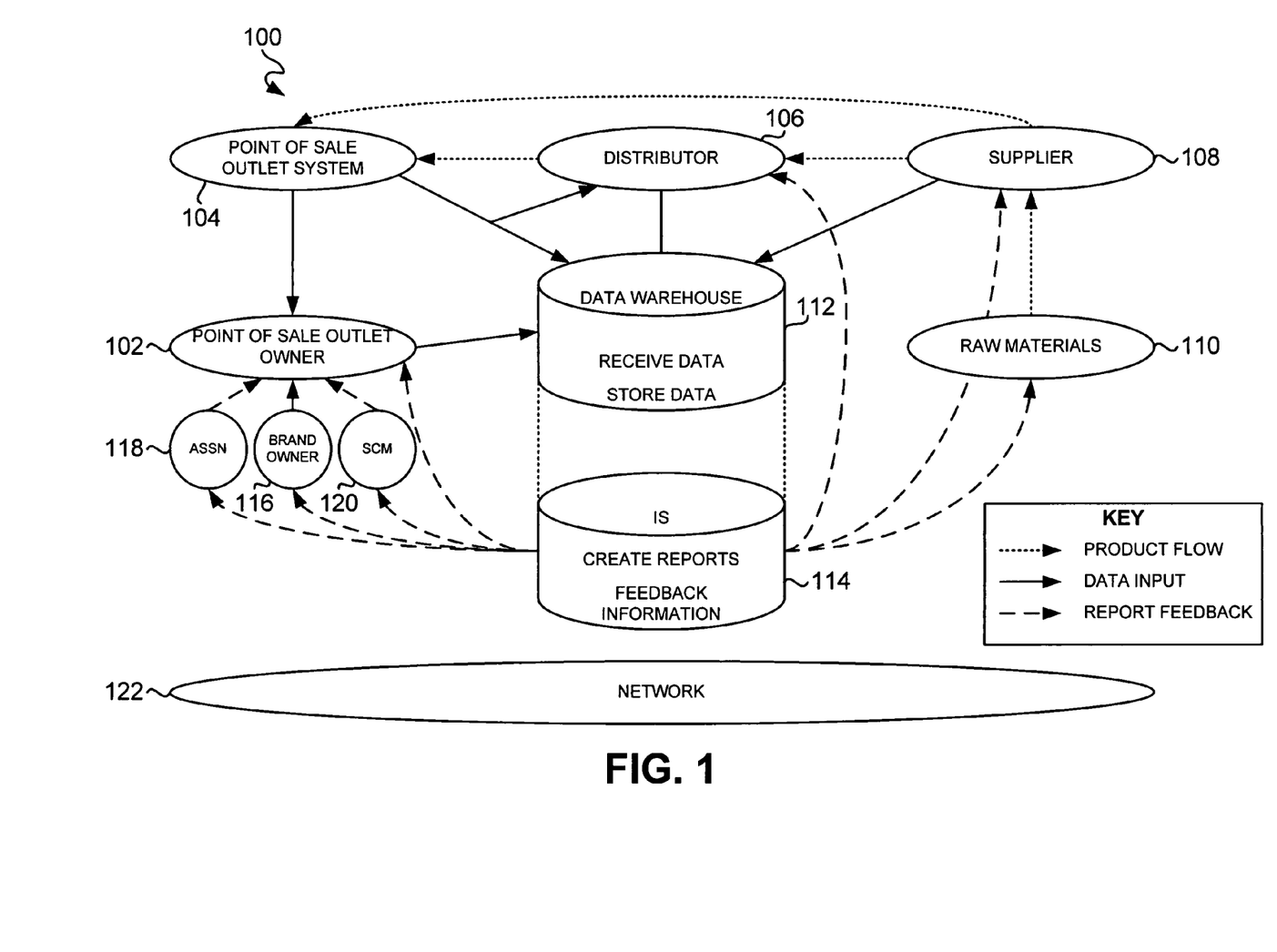
FIG. 1 is a schematic block diagram of a supply chain management system in accordance with one embodiment of the present invention.

In general, the supply chain management system integrates various components, which components may include:
1. In-Participant Systems
2. A Retailer/Distributor Electronic Interface
3. A Supplier/Distributor Electronic Interface
4. A Data Warehouse
5. An Information Services
6. A Network such as a Web Architecture and Internet Access FIG. 1 illustrates an electronic reporting and feedback system 100 according to an embodiment of the present invention.

The In-Participant Systems 102 support point of sale outlet owners with Point of Sale (POS) and BOH (back-of-house) hardware and software solutions. This component enables electronic data collection of daily item sales for the information database. In the context of a restaurant, this collection of daily item (POS) sales might comprise menu sales. In the context of a supplier such as a factory, such POS sales might comprise inventory shipments out of the factory. Accordingly, for purposes of the present invention, the term "sales" is to be interpreted to include movement of product, either through retail sales of the product, or an inventory shipment out of a supplier.

The Retailer-Distributor Electronic Interface establishes an electronic purchasing system and thus "electronic commerce" between POS outlets 104 and distributors/"direct" suppliers 106, 108. This includes electronic order entry over the network such as via the Web, order confirmation, product delivery/receiving, electronic invoicing, electronic wire payment transfers, data collection, and contract compliance and distributor performance measurement, which assists in managing distributor performance.

The Supplier-Distributor Electronic Interface facilitates the development of electronic commerce between system suppliers and distributors including electronic ordering and confirmations, electronic invoicing and payments and electronic supplier performance measuring and reporting. Electronic commerce between raw material suppliers 110 and suppliers is also provided.

In one embodiment of the invention, a Data Warehouse 112 may be used to provide a central collection point (note that in other embodiments, this could be a distributed warehouse) that electronically collects and warehouses timely, critical Supply Chain information for all Supply Chain participants. This includes distributor and supplier performance measures, representations of daily outlet item sales with translations to specified product requirements, and inventory levels, sales history and forecasts at various points in the Supply Chain, thereby providing a basis for collaborative planning and forecasting. The data stored in the Warehouse is then available for quick, secure access.

Information Services analyzes 114, organizes and feeds back Supply Chain data to meet the information needs of Supply Chain users such as a brand owner 116, the Supply Chain-Coordinator (SCC) 118, retail outlet management 120 and suppliers. This includes information on Supply Chain performance, collaborative planning and forecasting, promotion planning and inventory management. Services that benefit franchisees include electronic invoice auditing, distributor performance reporting, cost reporting and analysis, franchisee sales/cost comparables, and other reports. Information Services also determines a proper format in which to present the data so that it is in the most useful form for the end user. It also works with Supply Chain users to develop/evaluate analytical/operational tools.

A network 122 is provided to underlie this supply chain structure. In one embodiment the network may comprises a web architecture with Internet access (through proprietary service or an Internet Service Provider (ISP)) that allows these electronic communications to take place efficiently and effectively. Encompassed in this component is the building of initial web applications and security for the Supply Chain.

Figure 2:
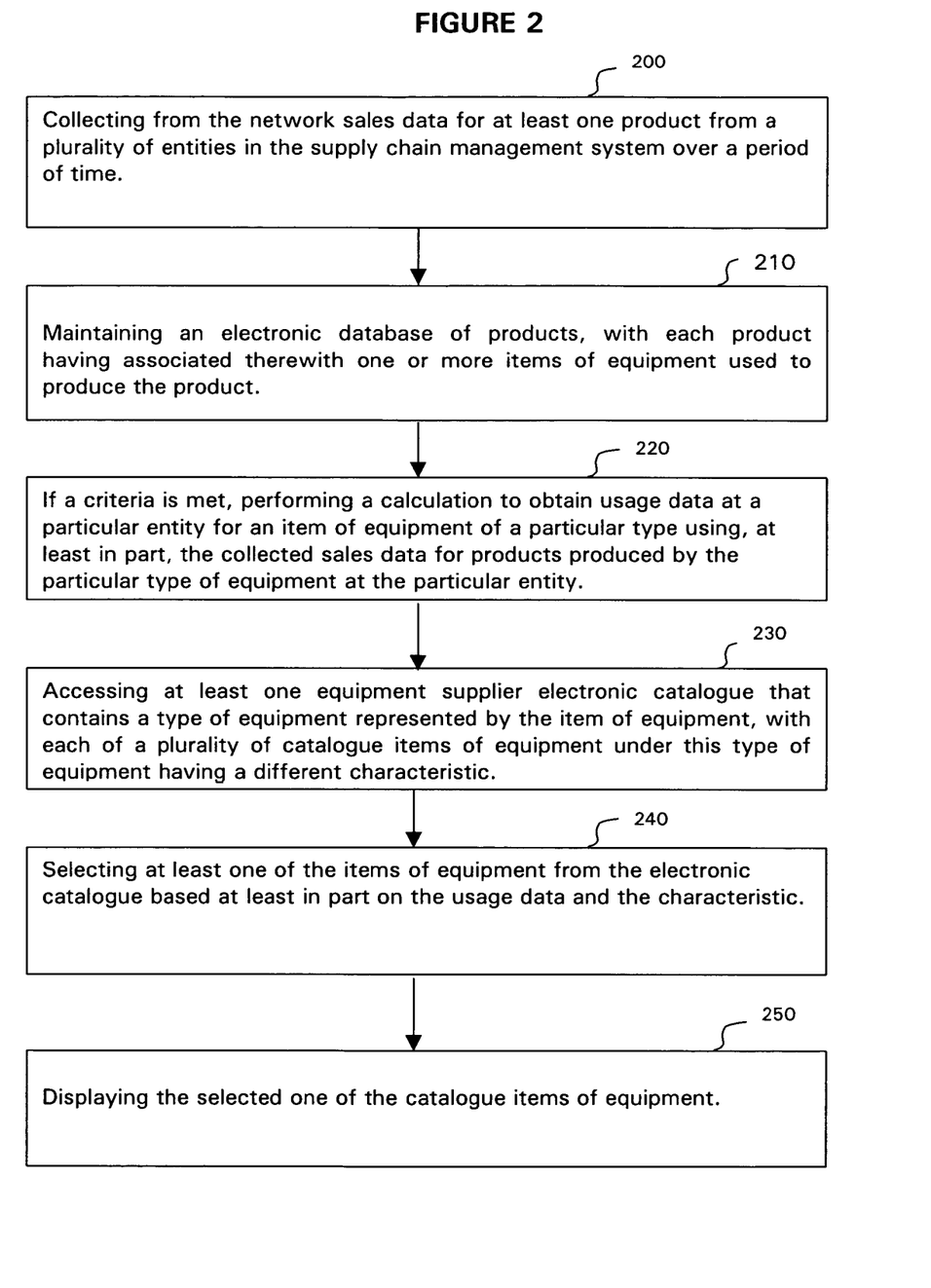
FIG. 2 is a flowchart for an implementation for one embodiment of the present invention.

Referring now to FIG. 2, a flowchart representing one implementation of the present invention is provided. Referring to block 200, the operation of collecting sales data from the network for at least one product from a plurality of entities in the supply chain management system over a period of time is represented. The entities 20 in the supply chain could be individual stores or suppliers, or any other entity or group of entities that produce products and would require a periodic replacement of the equipment used to produce those products.

Referring to block 210, the operation of maintaining an electronic database of products, with each product having associated therewith in the database one or more items of equipment used to produce the product is represented. In the context of the embodiment of FIG. 1, this operation could be performed by the data warehouse 112.

Referring to block 230, the operation is provided of, if a criteria is met, performing a calculation to obtain usage data at a particular entity for an item of equipment of a particular type using, at least in part, the collected sales data for products produced by the particular type of equipment at the particular entity. For example, sales data may be received from a given entity that may be a restaurant over a period of time that the restaurant has sold 1,000,000 hamburgers since a new hamburger cooker was installed one year ago. If one hamburger cooker is present in the restaurant, then the usage for that cooker is 1,000,000 per year. If there are two hamburger cookers in the restaurant, then the usage per cooker is 500,000 per year.

In one embodiment, the criteria may be that a request has been received over the network from an entity in the supply chain management system for purchase information for the item of equipment. That entity may be the restaurant in the above example that may have sent in the request because the hamburger cooker is malfunctioning. Alternatively, the criteria may be that the usage data for the item of equipment has been compared to a usage rating associated with that item of equipment, and it has been determined that the usage rating is exceeded by a predetermined amount. The usage rating for the equipment would for this embodiment be stored in the electronic database.

Referring to block 240, an operation is provided of accessing at least one equipment supplier electronic catalogue that contains a type of equipment represented by the item of equipment, with each of a plurality of the catalogue items of equipment under this type of equipment having a different characteristic. In the example above, the item is a hamburger cooker. The characteristic may be, for example, a volume characteristic (e.g., cooking 20 hamburger patties at a time), an energy characteristic (e.g., 300 Watts), a speed characteristic (e.g., 20 hamburger patties cooked in 2 minutes). The particular characteristic is not limiting to the invention.

Referring to block 250, the operation is provided of selecting at least one of the items of equipment in the catalogue based on the usage data for the item of equipment and the characteristic. In one embodiment, this characteristic may be related to a selected optimization goal, such as cost, maintenance requirements, energy requirements, and level of service. The selection of the at least one catalogue item would then be based on the selected optimization goal, the usage data, and the characteristic that relates to that optimization goal.

In a yet further embodiment of the present invention, the electronic database contains information about a size of an equipment workspace for the entity, and wherein the selecting step uses the size of the equipment workspace as a characteristic or one of the characteristics in selecting the catalogue item of equipment.

Referring to block 260, the operation is provided of displaying the selected one of the catalogue items of equipment. This display may be via a screen at the site of the entity, or it may be displayed to supply chain management personnel, for example.

In a further embodiment of the present invention, a plurality of different equipment supplier catalogues are accessed and at least one catalogue item is selected from among this plurality of equipment supplier catalogues. In a further embodiment, a catalogue item of equipment is selected from each of a plurality of equipment supplier catalogues and displayed. For example, a best selection according to the desired characteristic and the usage data may be selected for each equipment brand.

It should be noted that the item of equipment that is to be replaced may be used to produce at least two different products. For example, in the context of a restaurant the cooker could be used to cook hamburgers, but may also be used to cook fish for fish sandwiches. Thus, the usage data would include the volume for both hamburgers and fish sandwiches at that restaurant.

In a further embodiment of the present invention, a name of a second item of equipment related to the production of the product or products produced by the item of equipment is associated with the product in the database, and at least the name of the second item of equipment is displayed for potential replacement to the entity with the display of the selected catalogue item of equipment. For example, in the restaurant context, hamburgers may be sold with fries in most cases, so that if the hamburger cooker requires replacement, then the frier for cooking the fries may also soon need replacement. Thus, a query can be included with the hamburger cooker information "Do you wish to replace the frier?" Alternatively, an actual selection of a frier from the electronic catalogue can be made based on the usage data and a characteristic.

In a yet further embodiment of the present invention, the electronic database may contain warranty period information associated with the item of equipment, and the operation may be included of performing a time algorithm to determine if the warranty associated with the item of equipment has lapsed. If the warranty for the item of equipment has not lapsed, then sending a message via the network to the entity making a notification relating to the warranty, such as "Equipment is still under warranty."

Figure 3:
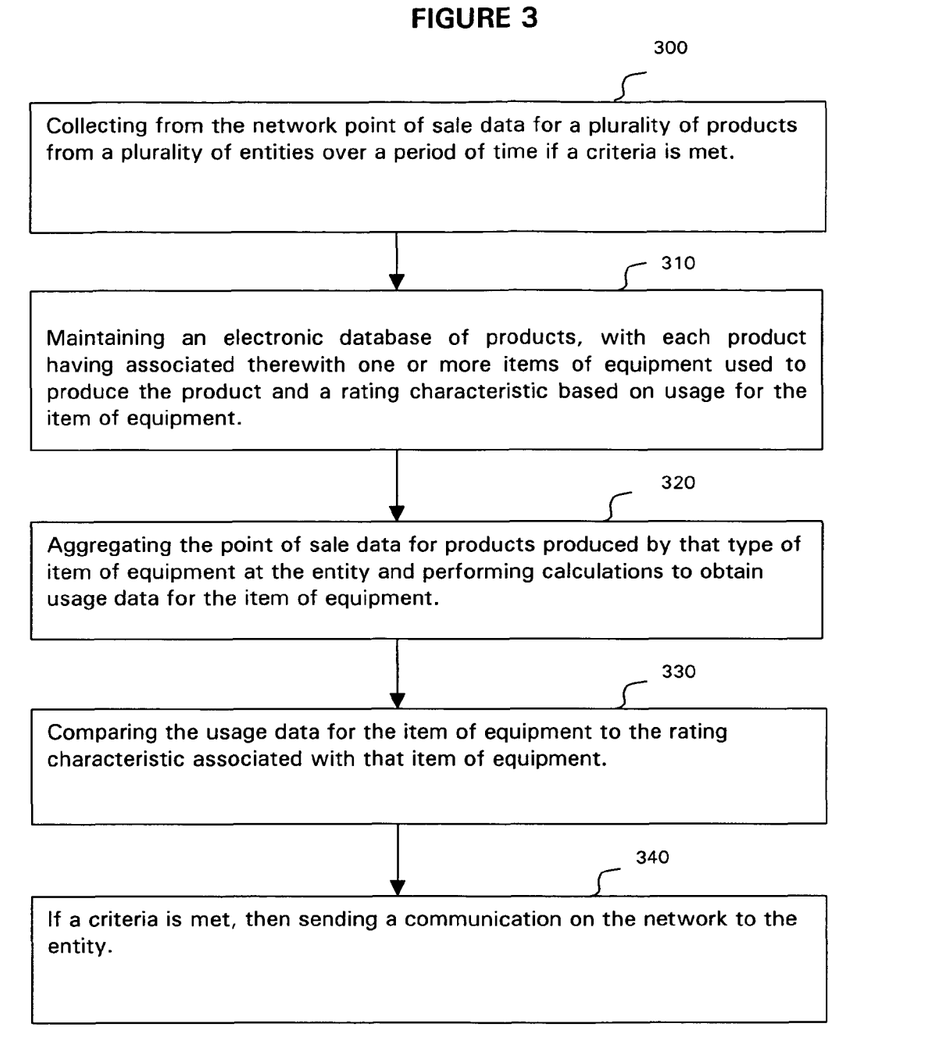
FIG. 3 is a flowchart for an implementation for a second embodiment of the present invention.

A yet further embodiment of the present invention is described in FIG. 3. Referring to block 300, network point of sale data for a plurality of products from a plurality of entities over a period of time is collected from the network.

Referring to block 310, an electronic database of products is maintained, with each product having associated therewith in the database one or more items of equipment used to produce the product and a rating characteristic based on usage for the item of equipment. For example, the rating characteristic in one embodiment may be a projected usage life for the item of equipment. In another embodiment, the rating characteristic may be a level of service. In yet another embodiment, the rating characteristic may be an energy rating. In yet a further embodiment, the rating characteristic may be a maintenance requirement.

Referring to block 320, the point of sale data is aggregated for the products produced by that type of item of equipment at the entity, and then calculations are performed to obtain usage data for the item of equipment, for example, as described above for the previous embodiment.

Referring to block 330, the usage data for the item of equipment is compared to the rating characteristic associated with that item of equipment.

Referring to block 340, if a criteria is met, then sending a communication on the network to the entity. For example, if the rating characteristic is a projected usage life for the item of equipment, then the criteria might be that the usage data indicates a usage that exceeds by a predetermined amount the projected usage life of the item of equipment. The communication may be that the usage life for this item of equipment has been exceeded and to expect to need to replace the item of equipment shortly. The communication may include a recommendation to purchase a replacement item if equipment. As another example, if the rating characteristic for a restaurant is a level of service for a milk shake machine that is designed to make 100 milk shakes per day with one minute required to produce each milk shake, but the restaurant entity is selling 170 milk shakes per day, then the level of service will be rated as poor because one or more employees are projected to be waiting for access to the milk shake machine at any given time. Thus, the communication on the network to the entity may be that the maximum use of the restaurant's employees and thus maximum level of service is not being realized due to the delay caused by waiting for access to the milk shake machine. The communication may include a recommendation to obtain a higher volume producing milk shake machine. As a yet further example, if the rating characteristic in a restaurant is energy usage of a large volume potato frier, and if the equipment usage data indicates that only one third of the volume of the frier is being used to produce the potato orders for that restaurant, then because significant energy is being wasted because the entire frier is being heated up for this limited production. A communication may thus be sent indicating this waste of energy. The communication in some embodiments may include a recommendation to purchase a smaller volume frier.

In a further embodiment, this communication may be coupled with or include a link to one or more catalogue items that comport with this communication. Accordingly, this would entail accessing at least one electronic equipment supplier catalogue that contains a type of equipment represented by the item of equipment, with each of a plurality of the catalogue items of equipment under this type of equipment having a different characteristic; selecting one of the catalogue items of equipment based at least in part on the usage data for the item of equipment; and this rating characteristic, and displaying the selected one of the catalogue items of equipment to the entity.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A non-transitory computer readable program product storing machine-readable program code for causing, when executed by a computer, a machine to perform the following method for a supply chain management system utilizing a network:
   collecting sales data from the network regarding the sale of at least one product from a plurality of entities in the supply chain management system over a period of time;
   maintaining an electronic database of products, with each product having associated therewith in the database one or more items of equipment used to produce the product;
   based on a criteria, performing a calculation to obtain usage data at a particular entity for an item of equipment of a particular type using, at least in part, the collected sales data for products produced by the particular type of equipment at the particular entity;
   accessing at least one equipment supplier electronic catalogue that contains the particular type of equipment represented by the item of equipment, with each of a plurality of catalogue items of equipment under this type of equipment having a different characteristic;
   selecting at least one of the items of equipment in the catalogue based on the usage data for the item of equipment and the characteristic; and
   displaying the selected one of the catalogue items of equipment.

2. The non-transitory computer readable program product as defined in claim 1, wherein the step of performing a calculation comprises for the particular type of equipment aggregating from the collected sales data for the products produced by the particular type of equipment at a particular entity and performing calculations to obtain usage data for the item of equipment of the particular type.

3. The non-transitory computer readable program product as defined in claim 1, wherein the criteria is that a request has been received over the network from an entity in the supply chain management system for purchase information for the item of equipment.

4. The non-transitory computer readable program product as defined in claim 1, wherein the criteria is that the usage data for the item of equipment has been compared to a usage rating associated with that item of equipment; and it has been determined that the usage rating is exceeded by a predetermined amount.

5. The non-transitory computer readable program product as defined in claim 1, comprising:
   receiving a selection of an optimization goal;
   selecting the at least one catalogue item based on the selected optimization goal, the usage data, and the characteristic.

6. The non-transitory computer readable program product as defined in claim 5, wherein the optimization goal is one of cost, maintenance requirements, energy requirements, and level of service.

7. The non-transitory computer readable program product as defined in claim 1,
   wherein the calculation comprises dividing the usage data by the number of the items of equipment of the same type used by the entity to produce the product.

8. The non-transitory computer readable program product as defined in claim 1, wherein a plurality of different equipment supplier catalogues are accessed.

9. The non-transitory computer readable program product as defined in claim 8, wherein a catalogue item of equipment is selected from each of a plurality of equipment supplier catalogues and displayed.

10. The non-transitory computer readable program product as defined in claim 1, wherein the item of equipment is used to produce at least two different products.

11. The non-transitory computer readable program product as defined in claim 1, wherein a name of a second item of equipment related to the production of the product or products produced by the item of equipment are associated with the product in the database; and
   displaying the name of the second item of equipment for potential replacement to the entity with the display of the selected catalogue item of equipment.

12. The non-transitory computer readable program product as defined in claim 1, wherein the database contains information about a size of an equipment workspace for the entity, and wherein the selecting step uses the size of the equipment workspace as a factor in selecting the catalogue item of equipment.

13. A non-transitory computer readable program product storing machine-readable program code for causing, when executed by a computer, a machine to perform the following method for a supply chain management system utilizing a network:
   collecting sales data from the network regarding the sale of at least one product from a plurality of entities in the supply chain management system over a period of time;
   maintaining an electronic database of products, with each product having associated therewith in the database one or more items of equipment used to produce the product;
   based on a criteria, performing a calculation to obtain usage data at a particular entity for an item of equipment of a particular type using, at least in part, the collected sales data for products produced by the particular type of equipment at the particular entity;
   accessing at least one equipment supplier electronic catalogue that contains the particular type of equipment represented by the item of equipment, with each of a plurality of catalogue items of equipment under this type of equipment having a different characteristic;
   selecting at least one of the items of equipment in the catalogue based on the usage data for the item of equipment and the characteristic;
   displaying the selected one of the catalogue items of equipment,
   wherein the database contains warranty period information associated with the item of equipment;
   performing a time algorithm to determine if the warranty associated with the item of equipment has lapsed; and
   if the warranty for the item of equipment has not lapsed, then sending a message via the network to the entity making a notification relating to the warranty.

14. A non-transitory computer readable program product storing machine-readable program code for causing, when executed by a computer, a machine to perform the following method for a supply chain management system utilizing a network:
   collecting point of sale data from the network regarding the sale of a plurality of products from a plurality of entities over a period of time;
   maintaining an electronic database of products, with each product having associated therewith in the database one or more items of equipment used to produce the product and a rating characteristic based on usage for the item of equipment;
   aggregating the point of sale data for products produced by that type of item of equipment at the entity and performing calculations to obtain usage data for the item of equipment;
   comparing the usage data for the item of equipment to the rating characteristic associated with that item of equipment; and
   based on a criteria, then sending a communication on the network to the entity.

15. The non-transitory computer readable program product as defined in claim 14, further comprising program code for:
   accessing at least one electronic equipment supplier catalogue that contains a type of equipment represented by the item of equipment, with each of a plurality of the catalogue items of equipment under this type of equipment having a different characteristic;
   selecting one of the catalogue items of equipment based at least in part on the usage data for the item of equipment; and
   displaying the selected one of the catalogue items of equipment to the entity.

16. The non-transitory computer readable program product as defined in claim 14, wherein the rating characteristic is projected usage life for the item of equipment.

17. The non-transitory computer readable program product as defined in claim 14, wherein the rating characteristic is a level of service.

18. The non-transitory computer readable program product as defined in claim 14, wherein the rating characteristic is an energy rating.

19. The non-transitory computer readable program product as defined in claim 14, wherein the rating characteristic is a maintenance requirement.

20. A computer implemented method for a supply chain management system utilizing a network, comprising:
- collecting, via the computer, sales data from the network regarding the sale of at least one product from a plurality of entities in the supply chain management system over a period of time;
- maintaining, via the computer, an electronic database of products, with each product having associated therewith in the database one or more items of equipment used to produce the product;
- based on a criteria, performing, via the computer, an electronic calculation to obtain usage data at a particular entity for an item of equipment of a particular type using, at least in part, the collected sales data for products produced by the particular type of equipment at the particular entity;
- accessing, via the computer, at least one equipment supplier electronic catalogue that contains the particular type of equipment represented by the item of equipment, with each of a plurality of catalogue items of equipment under this type of equipment having a different characteristic;
- selecting, via the computer, at least one of the items of equipment in the catalogue based on the usage data for the item of equipment and the characteristic; and
- displaying the selected one of the catalogue items of equipment.

21. A method as defined in claim 20, wherein the step of performing a calculation comprises for the particular type of equipment aggregating from the collected sales data sales data for the products produced by the particular type of equipment at a particular entity and performing calculations to obtain usage data for the item of equipment of the particular type.

22. The method as defined in claim 20, wherein the criteria is that a request has been received over the network from an entity in the supply chain management system for purchase information for the item of equipment.

23. The method as defined in claim 20, wherein the criteria is that the usage data for the item of equipment has been compared to a usage rating associated with that item of equipment; and
- it has been determined that the usage rating is exceeded by a predetermined amount.

24. The method as defined in claim 20, comprising:
- receiving a selection of an optimization goal;
- selecting the at least one catalogue item based on the selected optimization goal, the usage data, and the characteristic.

25. The method as defined in claim 24, wherein the optimization goal is one of cost, maintenance requirements, energy requirements, and level of service.

26. The method as defined in claim 20,
- wherein the calculation comprises dividing the usage data, by the number of the items of equipment of the same type used by the entity to produce the product.

27. The method as defined in claim 20, wherein a plurality of different equipment supplier catalogues are accessed.

28. The method as defined in claim 27, wherein a catalogue item of equipment is selected from each equipment supplier catalogue and displayed.

29. The method as defined in claim 20, wherein the item of equipment is used to produce at least two different products.

30. The method as defined in claim 20, wherein a name of a second item of equipment related to the production of the product or products produced by the item of equipment are associated with the product in the database; and
- displaying the name of the second item of equipment for potential replacement to the entity with the display of the selected catalogue item of equipment.

31. The method as defined in claim 20, wherein the database contains information about a size of an equipment workspace for the entity, and wherein the selecting step uses the size of the equipment workspace as a factor in selecting the catalogue item of equipment.

32. A computer implemented method for a supply chain management system utilizing a network, comprising:
- collecting, via the computer, sales data from the network regarding the sale of at least one product from a plurality of entities in the supply chain management system over a period of time;
- maintaining, via the computer, an electronic database of products, with each product having associated therewith in the database one or more items of equipment used to produce the product;
- based on a criteria, performing, via the computer, an electronic calculation to obtain usage data at a particular entity for an item of equipment of a particular type using, at least in part, the collected sales data for products produced by the particular type of equipment at the particular entity;
- accessing, via the computer, at least one equipment supplier electronic catalogue that contains the particular type of equipment represented by the item of equipment, with each of a plurality of catalogue items of equipment under this type of equipment having a different characteristic;
- selecting, via the computer, at least one of the items of equipment in the catalogue based on the usage data for the item of equipment and the characteristic;
- displaying the selected one of the catalogue items of equipment,
- wherein the database contains warranty period information associated with the item of equipment;
- performing a time algorithm to determine if the warranty associated with the item of equipment has lapsed; and
- if the warranty for the item of equipment has not lapsed, then sending a message via the network to the entity making a notification relating to the warranty.

33. A computer implemented method for a supply chain management system utilizing a network, comprising:
- collecting, via the computer, point of sale data from the network regarding the sale of a plurality of products from a plurality of entities over a period of time;
- maintaining, via the computer, an electronic database of products, with each product having associated therewith in the database one or more items of equipment used to produce the product and a rating characteristic based on usage for the item of equipment;
- electronically aggregating, via the computer, the point of sale data for the products produced by that type of item of equipment at the entity and performing calculations to obtain usage data for the item of equipment;
- comparing, via the computer, the usage data for the item of equipment to the rating characteristic associated with that item of equipment; and
- based on a criteria, then sending a communication on the network to the entity.

34. The method as defined in claim 33, further comprising:
- accessing at least one electronic equipment supplier catalogue that contains a type of equipment represented by the item of equipment, with each of a plurality of the catalogue items of equipment under this type of equipment having a different characteristic;

selecting one of the catalogue items of equipment based at least in part on the usage data for the item of equipment; and displaying the selected one of the catalogue items of equipment to the entity.

35. The method as defined in claim 33, wherein the rating characteristic is projected usage life for the item of equipment.

36. The method as defined in claim 33, wherein the rating characteristic is a level of service.

37. The method as defined in claim 33, wherein the rating characteristic is an energy rating.

38. The method as defined in claim 33, wherein the rating characteristic is a maintenance requirement.

39. A system for supply chain management utilizing a network, comprising:
an electronic storage; and
a processor that includes the following logic elements:
a component sales data for collecting from the network regarding the sale of at least one product from a plurality of entities in the supply chain management system over a period of time;
a component for maintaining an electronic database of products, with each product having associated therewith in the database one or more items of equipment used to produce the product;
a component for, based on a criteria, performing a calculation to obtain usage data at a particular entity for an item of equipment of a particular type using, at least in part, the collected sales data for products produced by the particular type of equipment at the particular entity;
a component for accessing at least one equipment supplier electronic catalogue that contains the particular type of equipment represented by the item of equipment, with each of a plurality of catalogue items of equipment under this type of equipment having a different characteristic;
a component for selecting at least one of the items of equipment in the catalogue based on the usage data for the item of equipment and the characteristic; and
a component for displaying the selected one of the catalogue items of equipment.

40. A system as defined in claim 39, wherein the component for performing a calculation for the particular type of equipment aggregates from the collected sales data sales data for the products produced by the particular type of equipment at a particular entity and performs calculations to obtain usage data for the item of equipment of the particular type.

41. The system as defined in claim 39, wherein the criteria is that a request has been received over the network from an entity in the supply chain management system for purchase information for the item of equipment.

42. The system as defined in claim 39, wherein the criteria is that the usage data for the item of equipment has been compared to a usage rating associated with that item or equipment; and it has been determined that the usage rating is exceeded by a predetermined amount.

43. The system as defined in claim 39, comprising:
a component for receiving a selection of an optimization goal;
a component for selecting the at least one catalogue item based on the selected optimization goal, the usage data, and the characteristic.

44. The system as defined in claim 43, wherein the optimization goal is one of cost, maintenance requirements, energy requirements, and level of service.

45. The system as defined in claim 39, wherein the calculation comprises dividing the usage data by the number of the items of equipment of the same type used by the entity to produce the product.

46. The system as defined in claim 39, comprising a component for accessing a plurality of different equipment supplier catalogues.

47. The system as defined in claim 46, comprising a component for selecting and causing the display of a catalogue item of equipment from each of a plurality of equipment supplier catalogues.

48. The system as defined in claim 39, wherein the item of equipment is used to produce at least two different products.

49. The system as defined in claim 39, wherein a name of a second item of equipment related to the production of the product or products produced by the item of equipment are associated with the product in the database in the database; and
a component for causing the display of the name of the second item of equipment for potential replacement to the entity with the display of the selected catalogue item of equipment.

50. The system as defined in claim 39, wherein the database contains information about a size of an equipment workspace for the entity, and wherein the selecting step uses the size of the equipment workspace as a factor in selecting the catalogue item of equipment.

51. A system for supply chain management utilizing a network, comprising:
an electronic storage; and
a processor that includes the following logic elements:
a component sales data for collecting from the network regarding the sale of at least one product from a plurality of entities in the supply chain management system over a period of time;
a component for maintaining an electronic database of products, with each product having associated therewith in the database one or more items of equipment used to produce the product;
a component for, based on a criteria, performing a calculation to obtain usage data at a particular entity for an item of equipment of a particular type using, at least in part, the collected sales data for products produced by the particular type of equipment at the particular entity;
a component for accessing at least one equipment supplier electronic catalogue that contains the particular type of equipment represented by the item of equipment, with each of a plurality of catalogue items of equipment under this type of equipment having a different characteristic;
a component for selecting at least one of the items of equipment in the catalogue based on the usage data for the item of equipment and the characteristic;
a component for displaying the selected one of the catalogue items of equipment, wherein the database contains warranty period information associated with the item of equipment;
a component for performing a time algorithm to determine if the warranty associated with the item of equipment has lapsed; and
if the warranty for the item of equipment has not lapsed, then sending a message via the network to the entity making a notification relating to the warranty.

52. A system for supply chain management utilizing a network, comprising:
an electronic storage; and
a processor that includes the following logic elements:

a component for collecting point of sale data from the network regarding the sale of a plurality of products from a plurality of entities over a period of time;

an electronic database of products, with each product having associated therewith in the database one or more items of equipment used to produce the product and a rating characteristic based on usage for the item of equipment;

a component for aggregating the point of sale data for the products produced by that type of item of equipment at the entity and performing calculations to obtain usage data for the item of equipment;

a component for comparing the usage data for the item of equipment to the rating characteristic associated with that item of equipment; and a component for, based on a criteria, sending a communication on the network to the entity.

53. The system as defined in claim 52, further comprising:

a component for accessing at least one electronic equipment supplier catalogue that contains a type of equipment represented by the item of equipment, with each of a plurality of the catalogue items of equipment under this type of equipment having a different characteristic;

a component for selecting one of the catalogue items of equipment based at least in part on the usage data for the item of equipment; and a component for causing a display of the selected one of the catalogue items of equipment to the entity.

* * * * *